Figure 1:
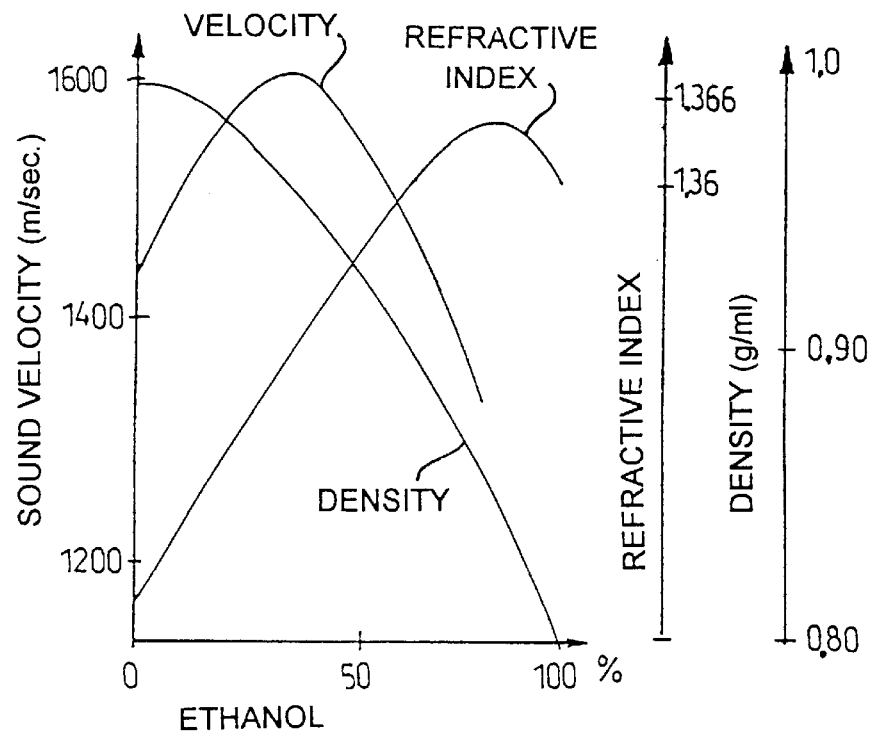

United States Patent
Salo

[11] Patent Number: 5,936,160
[45] Date of Patent: Aug. 10, 1999

[54] METHOD AND APPARATUS FOR MEASURING SOUND VELOCITY IN LIQUID

[75] Inventor: Harri Salo, Helsinki, Finland

[73] Assignee: Janesko Oy, Vantaa, Finland

[21] Appl. No.: 09/010,593

[22] Filed: Jan. 22, 1998

[30] Foreign Application Priority Data

Jan. 27, 1997 [FI] Finland .................................. 970336

[51] Int. Cl.$^6$ .................................................. G01H 5/00
[52] U.S. Cl. ............................................................ 73/597
[58] Field of Search .................................. 73/1.86, 1.83, 73/1.82, 597, 624, 627, 629, 632, 194, 61.49, 67.2; 367/128, 13

[56] References Cited

U.S. PATENT DOCUMENTS

| | | | |
|---|---|---|---|
| 3,751,979 | 8/1973 | Ims | 73/194 A |
| 3,789,655 | 2/1974 | Passeri | 73/24 |
| 3,807,222 | 4/1974 | Eggers | 73/67.2 |
| 3,892,127 | 7/1975 | Cirulis et al. | 73/61.1 |
| 4,235,099 | 11/1980 | Ishizaka | 73/32 A |
| 4,492,117 | 1/1985 | Chubachi | 73/597 |
| 5,060,507 | 10/1991 | Urmson et al. | 73/24.01 |
| 5,229,973 | 7/1993 | Guillot et al. | 367/13 |
| 5,379,270 | 1/1995 | Connolly | 367/128 |
| 5,398,538 | 3/1995 | Williams et al. | 73/10 V |
| 5,473,934 | 12/1995 | Cobb | 73/61.49 |

FOREIGN PATENT DOCUMENTS

| | | |
|---|---|---|
| 0 352 203 | 1/1990 | European Pat. Off. . |
| 893536 | 7/1989 | Finland . |

*Primary Examiner*—Hezron Williams
*Assistant Examiner*—Thuy Vinh Tran
*Attorney, Agent, or Firm*—Burns, Doane, Swecker & Mathis, L.L.P.

[57] ABSTRACT

A method and apparatus for measuring sound velocity in a liquid, said method comprising the transmitting of a sound pulse or a group of sound pulses to the liquid to be measured and the measuring of the transit time of the sound pulse or the group of sound pulses in the liquid to be measured. To improve the accuracy of measurement, the sound pulse or the group of sound pulses is simultaneously transmitted with one and the same transmitter both to the liquid to be measured and to the reference material in which sound velocity is previously known. The sound pulse or the group of sound pulses arriving from the liquid to be measured and from the reference material is received and the time interval is measured with one and the same measuring means.

8 Claims, 1 Drawing Sheet

METHOD AND APPARATUS FOR MEASURING SOUND VELOCITY IN LIQUID

The invention relates to a method for measuring sound velocity in a liquid, said method comprising the transmitting of a sound pulse or a group of sound pulses to the liquid to be measured and the measuring of the transit time of the sound pulse or the group of sound pulses in the liquid to be measured. The invention further relates to an apparatus for measuring sound velocity in a liquid.

Methods and apparatuses of this type are today known in different fields of technology in connection with measurements of different liquids. Velocity measurement of sound propagating in a liquid allows calculating the density, concentration, temperature or velocity of flow of the liquid to be measured. If for instance temperature is known, then density can be calculated. Utilizing the measurement of sound velocity is particularly well suited for certain materials and certain concentrations. As an example can be mentioned measurements of ethanol and methanol concentrations there where variation in optical refractive index is small.

Examples of known solutions include the ones described in the Finnish Patent Application 893536. Shortcomings of known solutions are complexity and inaccuracy of measurement, due to for instance responses and delays of different measuring sensors.

An object of the invention is to provide a method and apparatus with which the shortcomings of prior art can be eliminated. This is achieved with the invention. A method of the invention is characterized in that a sound pulse or a group of sound pulses is simultaneously transmitted with one and the same transmitter both to a liquid to be measured and to a reference material in which sound velocity is previously known and that the sound pulse or the group of sound pulses that arrives from the liquid to be measured and from the reference material is received and the time interval is measured with one and the same measuring means. An apparatus of the invention, in turn, is characterized in that said apparatus comprises, in addition to a space reserved for a liquid to be measured, a part consisting of a reference material in which sound velocity is previously known; that one and the same transmitter is arranged to simultaneously transmit the sound pulse or the group of sound pulses both to the liquid to be measured and to the reference material and that one and the same receiver is arranged to receive the sound pulse or the group of sound pulses arriving from the liquid to be measured and from the reference material and to calculate the time interval between the arriving sound pulses or groups of sound pulses.

An advantage of the invention is, above all, its simplicity and accuracy of measurement. The accuracy of measurement is due to the responses and delays of the transmitter and the receiver being cancelled in the measurement. Improved accuracy compared with previous solutions is also achieved because with the invention the distance travelled by sound both in the material to be measured and in the reference material can be very carefully measured compared with measuring devices placed on the walls of the measurement receptacle or measurement tube, or outside them.

Figure 2:
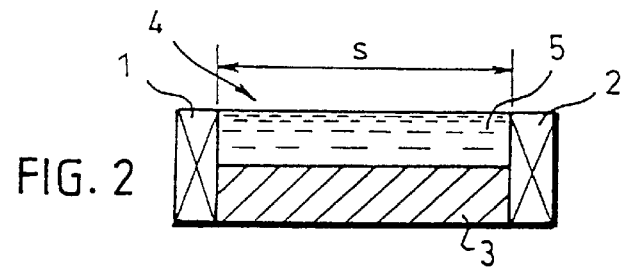
Figure 3:
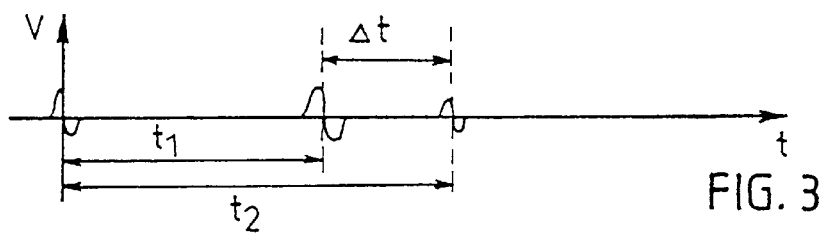
Figure 4:
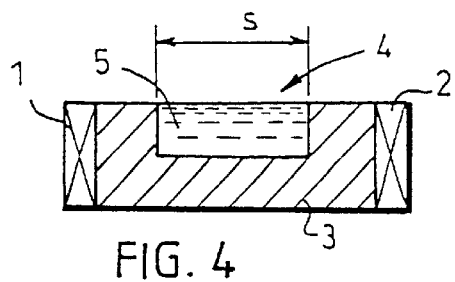
Figure 5:
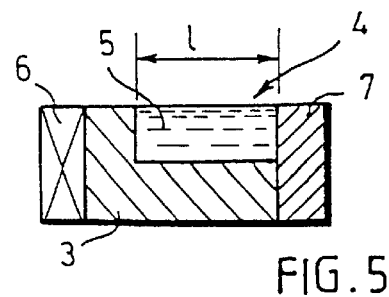

In the following the invention is described in greater detail with reference to examples of preferred embodiments illustrated in the attached drawings, in which FIG. 1 shows a general view of the correlation between different properties of ethanol and concentration, FIGS. 2 and 3 show a general view of an implementation of a method of the invention, FIG. 4 shows a general view of a first embodiment of an apparatus of the invention and FIG. 5 shows a general view of a second embodiment of an apparatus of the invention.

FIG. 1 shows a general view of the correlation of sound velocity and other properties of ethanol with concentration. As stated above, a measuring method based on sound velocity is particularly well suited for instance for measuring ethanol concentrations there where variation in optical refractive index is small.

FIGS. 2 and 3 illustrate a general view of a measuring method and apparatus of the invention. FIG. 2 shows a general view of a measuring apparatus. Reference number 1 indicates a transmitter and reference number 2 a receiver. The transmitter and the receiver have been arranged to function e.g. within an ultrasonic range. Reference number 3 indicates a part consisting of a reference material and reference number 4 indicates a space reserved for a liquid to be measured. The liquid to be measured is shown in FIG. 2 with reference number 5.

According to an essential idea of the invention, a sound pulse or a group of sound pulses is simultaneously transmitted with one and the same transmitter 1 both to the liquid 5 to be measured and the reference material 3 in which sound velocity is previously known. The sound pulse or the group of sound pulses arriving from the liquid 5 to be measured and the reference material 3 is received and the time interval is measured using one and the same measuring means, which in the case of FIG. 2 is the receiver 2. The sound pulse or the group of sound pulses is arranged to travel an equally long distance in the material to be measured and in the reference material. The distance travelled by the sound pulse or the group of sound pulses in the liquid 5 to be measured and in the reference material 3 is shown with reference S in FIG. 2.

The reference material 3 can be a liquid or a solid material, such as metal, plastic or ceramics. The distance S travelled by sound in the liquid to be measured and in the reference material is equally long, and previously known, as stated above. In accordance with the invention, one and the same measuring means, i.e. the receiver 2, is used for receiving the pulses arriving from both the liquid to be measured and the reference material and for measuring the time $\Delta t$ between these pulses. FIG. 3 illustrates this step.

Referring to FIGS. 2 and 3, let $t_1$ be the transit time of sound in the reference material and $t_2$ the transit time of sound in the liquid to be measured, which yields $$t_1 = \frac{S}{V_{Ref}} \text{ and } t_2 = \frac{S}{V_{Liq}}$$

The time $\Delta t$ between the pulses is then $$\Delta t = t_2 - t_1 = \frac{S}{V_{Liq}} - \frac{S}{V_{Ref}} = S\left(\frac{1}{V_{Liq}} - \frac{1}{V_{Ref}}\right)$$

$$\frac{1}{V_{Liq}} = \frac{\Delta t}{S} + \frac{1}{V_{Ref}}$$

The sound velocity $v_{Liq}$ is obtained by applying the formula $$V_{Liq} = \left( \frac{\Delta t}{S} + \frac{1}{V_{Ref}} \right)^{-1}$$

$\Delta t$ is measured and S and $v_{Ref}$ are constants. In addition, $v_{Ref} > v_{Liq}$. If $v_{Ref} < v_{Liq}$, then speed is obtained by applying the formula $$V_{Liq} = \left( \frac{1}{V_{Ref}} - \frac{\Delta t}{S} \right)^{-1}$$

Typically, $v_{Ref}$=5800 m/s (steel) and $v_{Liq}$=1500 m/s (ethanol), so the first formula is valid.

The advantage the method of the invention provides compared with the measuring of direct speed of propagation is more accurate measurement of time, because the time interval is measured with one and the same measuring means. The responses and delays of the transmitter sensor and the receiver sensor and the related electrical parts are thus cancelled in the measurement. The error in the measurement of time becomes smaller as the distance S grows. As stated earlier, the distance travelled by sound in the reference material 3 and in the liquid to be measured can also be most accurately measured, as compared with for instance devices installed outside the walls of the measurement receptacle.

The method of the invention can be applied using an apparatus which comprises two ultrasonic probes of which one functions as a transmitter 1 and the other as a receiver 2. Between the transmitter 1 and the receiver have been arranged the reference material 3 and the liquid to be measured 5. This basic principle is shown in FIG. 2.

The basic principle of the invention can also be applied as shown in FIG. 4. The same reference numbers as in FIG. 2 are used for the corresponding parts in FIG. 4. The principle of the embodiment shown in FIG. 4 is the same as the embodiment in FIG. 2, in which a transmitter and a receiver are used, with the measuring area and the reference material arranged between them. In the embodiment of FIG. 4, between the transmitter 1 and the measuring area and, correspondingly, between the measuring area and the receiver 2 there is a transmission path consisting of the reference material. As can be seen in FIG. 4, the length and material of said transmission path are the same for both the reference pulse and the measurement pulse, so the effect of the transmission path is cancelled and the formula given above is valid. The transmission path can be of the same material as the transmission path in the reference material and it can function also as an interface between the liquid and the measuring device, as in the embodiment in FIG. 2. The transmission path can also be of different material than the reference material, the essential feature being that the material and the length of the transmission path are the same for both the reference pulse and the measuring pulse, whereby the effect of the transmission path is cancelled as stated above.

In the embodiment of FIG. 5, one probe 6 and a reflector element 7 are used. The probe 6 functions first as a transmitter and transmits a sound pulse both to the reference material 3 and to the liquid 5 to be measured. After the transmission the probe 6 functions as a receiver and receives signals arriving both from the reference material 3 and the liquid to be measured, said signals being reflected from the reflector element 7. A distance I of the reflector element 7 from the probe 6 determines the distance travelled by the sound in the liquid so that S=2×I. It is evident that the probe 6 can also consist of a combined transceiver element or the probe 6 can consist of a transmitter and a receiver, etc.

The above examples of embodiments are in no way meant to restrict the invention, which can be completely freely varied within the claims. It is therefore apparent that an apparatus or any details of it need not necessarily be exactly like the ones shown in the drawings, but other solutions are also possible.

I claim:

1. A method for measuring sound velocity in a liquid, said method comprising the transmitting of a sound pulse or a group of sound pulses to the liquid to be measured and the measuring of the transit time of the sound pulse or the group of sound pulses in the liquid to be measured, the sound pulse or the group of sound pulses being simultaneously transmitted with one and the same transmitter both to a liquid to be measured and to a reference material in which sound velocity is previously known, and the sound pulse or the group of sound pulses that arrives from the liquid to be measured and from the reference material being received and the time interval being measured with one and the same measuring means.

2. A method according to claim 1, wherein the sound pulse or the group of sound pulses is arranged to travel an equally long distance in the liquid to be measured and in the reference material.

3. A method according to claim 1, wherein the sound pulse or the group of sound pulses is generated using ultrasonic waves.

4. An apparatus for measuring sound velocity in a liquid, said apparatus comprising a transmitter, which is arranged to transmit a sound pulse or a group of sound pulses to the liquid to be measured, and a receiver, which is arranged to receive the sound pulse or the group of sound pulses transmitted in the liquid to be measured, said apparatus comprising, in addition to a space reserved for the liquid to be measured, a part consisting of a reference material in which sound velocity is previously known; one and the same transmitter being arranged to simultaneously transmit the sound pulse or the group of sound pulses both to the liquid to be measured and to the reference material and one and the same receiver being arranged to receive the sound pulse or the group of sound pulses arriving from the liquid to be measured and from the reference material and to calculate the time interval between the arriving sound pulses or groups of sound pulses.

5. An apparatus according to claim 4, wherein the sound pulse or the group of sound pulses is arranged to travel an equally long distance in the liquid to be measured and in the reference material.

6. An apparatus according to claim 4, wherein the space reserved for the liquid to be measured and the reference material are arranged between the transmitter and the receiver.

7. An apparatus according to claim 4, wherein the transmitter and the receiver are arranged on one side of the space reserved for the liquid to be measured and the reference material and that on the other side of the space reserved for the liquid to be measured and the reference material is arranged a reflector element.

8. An apparatus according to claim 1, wherein the transmitter is arranged to operate within an ultrasonic range.

* * * * *